(12) United States Patent
Kawai et al.

(10) Patent No.: US 7,433,965 B2
(45) Date of Patent: Oct. 7, 2008

(54) PACKET TRANSMISSION SYSTEM, PACKET TRANSMISSION METHOD, PACKET TRANSMISSION DEVICE, HOME AGENT, MOBILE TERMINAL, AND ACCESS ROUTER

(75) Inventors: Hiroyuki Kawai, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 725 days.

(21) Appl. No.: 10/384,604

(22) Filed: Mar. 11, 2003

(65) Prior Publication Data

US 2003/0174733 A1   Sep. 18, 2003

(30) Foreign Application Priority Data

Mar. 13, 2002   (JP) ............................ 2002-069000

(51) Int. Cl.
G06F 15/16 (2006.01)
G06F 15/173 (2006.01)
H04L 12/28 (2006.01)

(52) U.S. Cl. ........................ 709/238; 709/239; 709/240; 709/241; 709/242; 709/202; 370/351

(58) Field of Classification Search ......... 709/238–244, 709/202–204, 217–218, 231, 236; 370/498, 370/217–224, 235, 351, 352
See application file for complete search history.

(56) References Cited

U.S. PATENT DOCUMENTS 5,327,575 A   7/1994   Menich
5,649,308 A   7/1997   Andrews
5,794,145 A   8/1998   Milam
6,240,274 B1  5/2001   Izadpanah
6,256,300 B1* 7/2001   Ahmed et al. ............... 370/331
6,408,001 B1* 6/2002   Chuah et al. ................ 370/392
6,735,190 B1* 5/2004   Chuah et al. ................ 370/352
6,795,857 B1* 9/2004   Leung et al. ................ 709/224
2002/0018456 A1  2/2002  Kakemizu et al.
2003/0210663 A1* 11/2003 Everson et al. ............. 370/329
2004/0031054 A1*  2/2004 Dankworth et al. .......... 725/86
2007/0153729 A1*  7/2007 Alapuranen ................ 370/329

FOREIGN PATENT DOCUMENTS

| EP | 0 896 442 A1 | 2/1999 |
|---|---|---|
| JP | 6-508497 | 9/1994 |
| JP | 2000-216815 | 8/2000 |
| WO | WO 99/19999 | 4/1999 |
| WO | WO 00/38465 | 6/2000 |
| WO | WO 01/78240 A2 | 10/2001 |
| WO | WO 02/13420 | 2/2002 |

* cited by examiner

*Primary Examiner*—Saleh Najjar
*Assistant Examiner*—Asad M Nawaz
(74) *Attorney, Agent, or Firm*—Oblon, Spivak, McClelland, Maier & Neustadt, P.C.

(57) ABSTRACT

A packet transmission system is provided to achieve a higher throughput in downlink packet transmission to a mobile node. When there is a packet call directed to the mobile node, a transmission node in a network in this packet transmission system retrieves information as to a connection point of the mobile node from a distribution location information holder of a home agent. Packets are inputted to a packet distributor situated at the logical location designated by the retrieved connection point information. The packets are then distributed by the packet distributor to radio transmission devices, and are transmitted at once.

15 Claims, 6 Drawing Sheets

PACKET TRANSMISSION SYSTEM, PACKET TRANSMISSION METHOD, PACKET TRANSMISSION DEVICE, HOME AGENT, MOBILE TERMINAL, AND ACCESS ROUTER

BACKGROUND OF THE INVENTION

The present invention generally relates to packet transmission systems and packet transmission methods, and, more particularly, to a packet transmission system and a packet transmission method that perform downlink packet transmission from a network to a mobile node. The present invention also relates to a packet transmission device, a home agent, a mobile terminal, and an access router, all of which are employed in the packet transmission system. The present invention is aimed at increasing throughput of transmission packets.

As the IP (Internet Protocols)-based services have dramatically increased in recent years, mobile communication systems having higher affinities for IP traffic have been developed. In an IP-based mobile communication system (hereinafter referred to simply as the "packet transmission system"), packets directed to a mobile node (such as a portable telephone device) are transmitted through an access router (a router equipped with devices such as radio transmitters that can perform radio communication with the mobile node) that is situated at such a location as to be communicable with the mobile node.

For instance, when the mobile node moves to an end of an area within which the access router can perform transmission (this type of area will be hereinafter referred to simply as a "cell"), the transmission by the single access router becomes intermittent, resulting in quality degradation. To avoid quality degradation in the conventional packet transmission system, the cells are slightly overlaid on one another, so that a plurality of neighboring access routers can perform transmission to the mobile node when the mobile node exists in the vicinity of a cell edge. A handover technique is also applied to the above method so as to attenuate the quality degradation. Handover techniques can be divided into hard handover techniques and soft handover techniques. In a hard handover technique, an access router that can perform the best communication with the mobile node at a certain time is selected, and communication is performed with the mobile node through the selected access router. In a soft handover technique, on the other hand, a plurality of access routers that can perform transmission to the mobile node are selected, and the identical packets are transmitted to the mobile node through the selected access routers at the same time.

A conventional mobile node can be equipped with a plurality of radio receivers, and can switch the radio receivers according to a radio access method (such as the TDMA method or the CDMA method) that can be used in the area in which the mobile node is located. With the radio multiple receivers, the mobile node has the advantage of being able to perform communication as long as one of the radio receivers is communicable.

In the above conventional packet transmission system, however, the mobile node can receive only one packet at a time, regardless of which handover technique is employed. Accordingly, only one packet is transmitted to the mobile node, even where the access routers can perform packet transmission with high quality. As a result, the throughput in the conventional packet transmission system is always low.

Also, in the conventional packet transmission system, even when the mobile node employs a plurality of radio access methods and therefore more than one radio access methods are available, only one of the radio access methods is selected for transmission at a time, also resulting in a low throughput.

SUMMARY OF THE INVENTION

A general object of the present invention is to provide packet transmission systems and packet transmission methods in which the above disadvantages are eliminated.

A more specific object of the present invention is to provide a packet transmission system and a packet transmission method by which throughput in downlink packet transmission to a mobile node can be increased.

Another specific object of the present invention is to provide a packet transmission device, a home agent, a mobile terminal, and an access router that are employed in the packet transmission system of the present invention.

The above objects of the present invention are achieved by a packet transmission system that includes: a mobile node; a network that has a radio link with the mobile node, and transmits downlink packets to the mobile node; and a home agent that manages connection point information about the mobile node in the network. In this packet transmission system, the network includes a packet distributor that inputs and divides packets to be transmitted to the mobile node, and a packet parallel transmitter that distributes the packets divided by the packet distributor to a plurality of radio transmission devices provided in advance and then transmits the packets through the radio transmission devices. The mobile node includes a packet receiver that receives the packets transmitted by the packet parallel transmitter with a plurality of radio reception devices, and a packet combiner that combines the received packets to generate an original packet stream. The home agent includes a distributor location information holder that holds information of a logical location of the packet distributor as information of a connection point of the mobile node in the network. In this packet transmission system, when the network has packets to be transmitted to the mobile node, the network retrieves the connection point information from the distributor location information holder of the home agent, and inputs the packets to the packet distributor situated at the logical location specified by the retrieved connection point information.

In this packet transmission system, packets to be transmitted are distributed to the radio transmission devices by a distribution node, and are then transmitted to the mobile node through each of the radio transmission devices at once. Each of the packets is received by the radio reception devices in the mobile node. The packets are then combined to generate the original packet stream. Thus, the throughput of downlink packets transmitted from the network can be increased.

In the above packet transmission system, the radio transmission devices may be formed by one or more access routers each including one or more radio transmitters.

Also, in the above packet transmission system, the packet distributor may be provided within the one or more access routers.

In this packet transmission system, the distribution node is provided in the vicinity of the access routers, so that the group of radio receivers that can receive packets is reported directly to the distribution node from the mobile node. Thus, more precise packet transmission can be performed.

In the above packet transmission system, the packet distributor may include a communicable radio transmitter detector that determines whether each of the radio transmission devices is communicable with the mobile node.

In this packet transmission system, the distribution node inquires of each of the radio transmission devices that can serve as packet destinations whether it exists within an area in which the radio reception devices of the mobile node can perform communication. The distribution node then selects each radio transmission device that exists within the communicable area. Thus, more precise downlink packet transmission can be performed.

As the mobile node can decide whether downlink communication can be performed, the mobile node in the above packet transmission system may include a communication possibility notifying part that determines whether the mobile node can communicate with the radio transmission devices, and notifies a distribution node provided with the packet distributor of the determination result.

In the above packet transmission system, the packet distributor may include a packet distribution ratio setting part that sets an equal distribution ratio or a predetermined distribution ratio with which packets to be transmitted are distributed.

In this packet transmission system, packets are distributed at the same distribution rate, and the control process for packet distribution can be simplified, as long as the band widths of the radio transmission paths are substantially uniform.

To determine the packet distribution ratio in accordance with the conditions for communication or the requirements in the system, each of the access routers in the above packet transmission system may include a reported information notifying part that sends the packet distributor at least one piece of information as reported information, previously selected from information pieces including information as to each communicable band area, information as to communication charges, information as to delays in packet transfer from the packet distributor to the one or more radio transmitters, and information as to communication quality.

Also, in the above packet transmission system, the packet distributor may change the distribution ratio with which packets to be transmitted are distributed, based on the reported information sent by the reported information notifying part.

In this packet transmission system, packet distribution can be performed based on the specification and quality of each radio transmission path, using the information as to each communicable band area. Accordingly, packet transmission can be performed according to a distribution ratio that reflects the performance and the congestion state of each radio transmission path.

When the charges for the radio transmission paths vary, the communication charge information is used to perform highly economical packet transmission for users.

Using the information as to the delay in packet transfer from the distribution node to the access routers, packet transfer priority can be given to radio transmitters having smaller transfer delays. Thus, the packet transfer delay between the distribution node and the combiner in the mobile node can be minimized.

Using the information as to quality of service (QoS), packet transmission can be performed with quality corresponding to the quality of service.

Also, in the packet transmission system of the present invention, the packet distributor may include a packet transfer part that transfers packets distributed to the radio transmitters to the packet combiner in accordance with upper-layer protocols. The packet combiner may include a packet retriever that retrieves packets transferred by the packet transfer part in accordance with the upper-layer protocols.

In this packet transmission system, packet distribution and packet combining can be carried out in a lower layer, and, accordingly, the process delay caused by those processes can be minimized. Also, in this structure, the process of registering the logical location information of the distribution node that is the connection point of the upper layer, and the control operation of changing distribution ratios with a local move of the mobile node, are all performed in the lower layer. Accordingly, local handovers can be hidden from the upper layer. Thus, the delay in handover processes can be minimized, even if the home agent is situated at a distance from the distribution node (at a location where a greater process delay is caused in control data transfer in both directions). Further, if the load on the home agent becomes large due to similar handover process requests from a plurality of distribution nodes, the total load can be reduced.

Also, in the packet transmission system of the present invention, the packet distributor may include a special-purpose packet transfer (link) part that transfers packets to be distributed to the radio transmission devices through a special-purpose communication path.

In this packet transmission system, a part of or all of the transfer from the distribution node to the radio transmission devices is performed through the special-purpose communication path, instead of the upper layer. Thus, the packet transfer delay can be minimized.

Also, in the packet transmission system of the present invention, the packet distributor may include a packet upper-layer transfer part that transfers packets to be distributed to the radio transmission devices in accordance with upper-layer protocols.

In this packet transmission system, a part of or all of the transfer from the distribution node to the radio transmission devices is performed using the transfer function of the upper layer. Accordingly, packets can be distributed to desired radio transmission devices, as long as the connectability of the upper layer is maintained. Thus, the throughput can be increased.

Also, in the above packet transmission system of the present invention, the distributor location information holder may include a distribution node registration/update part that registers logical location information of another packet distributor determined by a distance between the mobile node and a radio transmission device to which packets are to be transmitted from a packet distributor being currently used by the mobile node when the mobile node moves a certain distance away from the radio transmission device, the other packet distributor being thereby registered as a new packet distributor to be used by the mobile node.

In this packet transmission system, the frequency of update of the logical location information of the distribution node (i.e., the connection point information of the upper layer) to be registered in the distributor location information holder of the home agent is made sufficiently lower than the switching frequency of the access routers that mainly perform packet transmission to the mobile node, so that the handover frequency in the upper layer can be lowered. As a result, the process necessary for the upper-layer handover can be simplified, and handover can be carried out at a higher speed.

In the above packet transmission system, the distribution node registration/update part may update and re-register the logical location information of the packet distributor based on information supplied from the mobile node.

Also, in the above packet transmission system, the mobile node may be a mobile communication terminal.

The above packet transmission system of the present invention may further include a router that relays packets from the network to the radio transmission devices. In this packet transmission system, the distributor location information holder of the home agent is provided in the router.

In this packet transmission system, the upper-layer connection point information to be registered in the home agent is held by the router. Thus, a simpler packet transmission system can be realized.

The above objects of the present invention are also achieved by a method of transmitting downlink packets from a network to a mobile node, with the network being connected to a home agent that manages information as to a connection point of the mobile node located in the network. The network includes a distribution node that inputs and distributes packets to be transmitted. This method includes the steps of:

retrieving information as to a logical location of the distribution node as the connection point information held in the home agent, when transmitting packets to the mobile node;
  inputting the packets to the distribution node situated at the logical information designated by the retrieved connection point information;
  transmitting the distributed packets from the distribution node to the mobile node through a plurality of radio transmission devices that are set in advance; and
  combining the packets transmitted through the radio transmission devices so as to generate an original packet stream by the mobile node.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
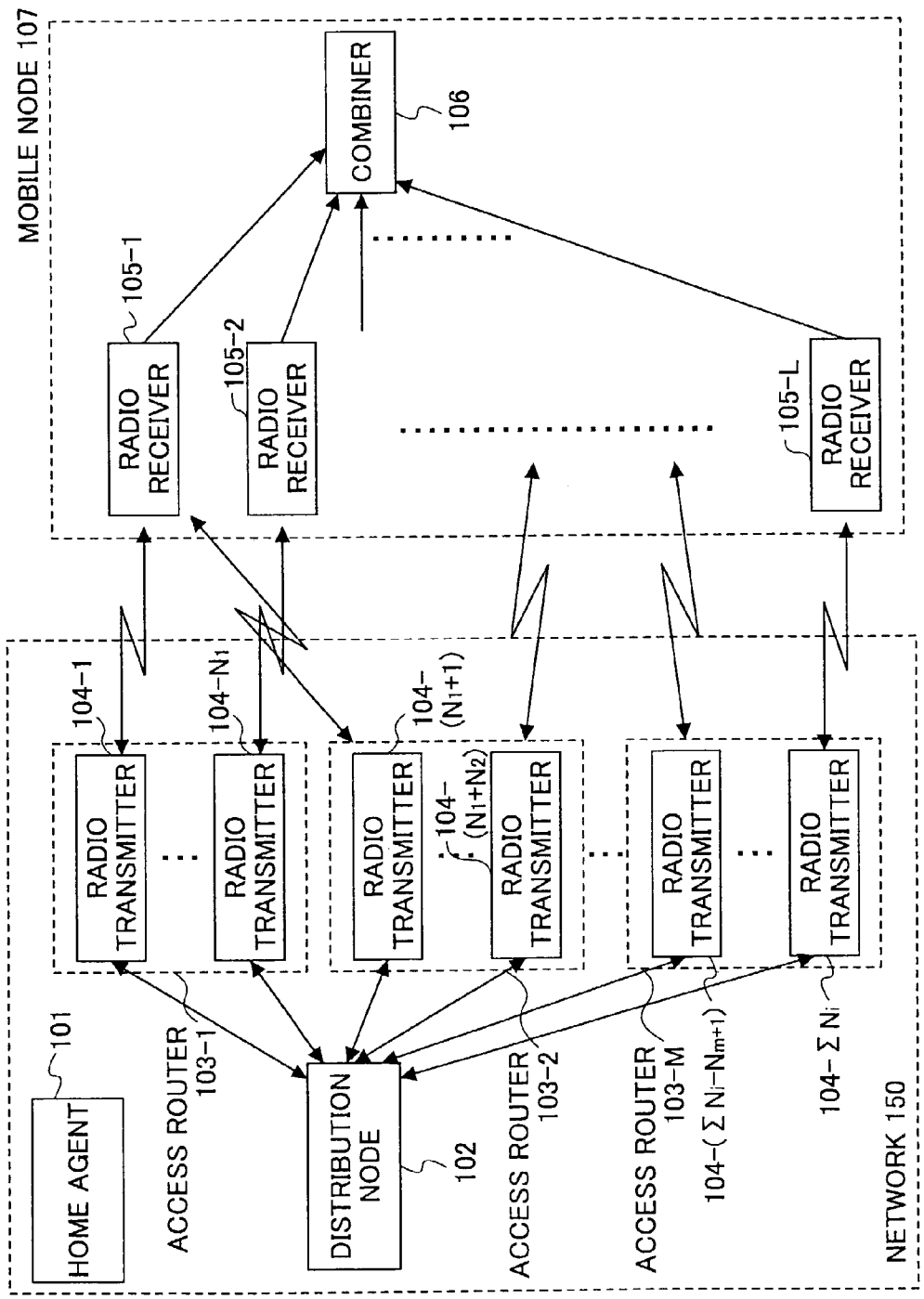
FIG. 1 illustrates an example structure of a packet transmission system in accordance with a first embodiment of the present invention.

FIG. 1 illustrates an example structure of a packet transmission system in accordance with a first embodiment of the present invention. As shown in FIG. 1, the packet transmission system of the present invention can be roughly divided into a network 150 and a mobile node (a mobile terminal) 107 (indicated by the dotted lines).

The network 150 includes a home agent 101 that holds the connection point information of the upper layers (such as the Internet protocols) of the mobile node 107 in the network 150, a distribution node 102 that distributes transmission packets directed to the mobile node 107, and radio transmission devices 103-1 through 103-M (M is an integer greater than 0) that provide radio links for the mobile node 107. The radio transmission devices 103-1 through 103-M will be hereinafter referred to as the "access routers". Each of the access routers 103-1 through 103-M is provided with $N_1, N_2, \ldots, N_M$ of radio transmitters 104-1 through 104-$\Sigma_{Ni}$ ($\Sigma_{Ni} = N_1 + N_2 + \ldots + N_M$), and the number M of the access routers is 1 or greater. The number of radio transmitters included in each of the access routers 103-1 through 103-M is also 1 or greater. The distribution node 102 may be independently located in the network 150, or may be provided to an arbitrary one(s) of the access routers 103-1 through 103-M. In this example, the distribution node 102 is independently located in the network 150. There may be two or more devices that function as the distribution node 102, but only one device should function as the distribution node for one mobile node.

The mobile node 107 includes one or more radio receivers 105-1 through 105-L that receive packets transmitted from the access routers 103-1 through 103-M of the network 150, and a combiner 106 that combines the received packets to generate a packet stream. The number L of the radio receivers 105-1 through 105-L provided in the mobile node 107 can be determined from the number of radio signals that are desired to be received. This mobile node 107 may be a portable telephone terminal, a portable information terminal equipped with the above radio receivers, or an in-car terminal, for example. Each of the radio transmitters 104-1 . . . , 104-$\Sigma_{Ni}$ in the network 150 is capable of communicating with one or more of the radio receivers 105-1 through 105-L in the mobile node 107.

The operation principles of the present invention will now be described, with reference to FIG. 1. Although not shown in the drawing, this packet transmission system has a transmission node for transmitting packets in the network 150. This transmission node is provided with IPs (such as Internet protocols) as upper layers, and performs packet transmission with a reception node (i.e., the mobile node 107 in this case) in accordance with the IPs. In the following, the operation in accordance with the above principles of the present invention will be described.

(Operation Principles)

When packets are transmitted from the transmission node of the network 150 to the mobile node 107, the transmission node inquires of the home agent 101 to which one(s) of the access routers 103-1 through 103-M in the network 150 should packets be transferred so as to be transmitted to the mobile node 107 The transmission node retrieves the information as to the logical location of the distribution node 102 that distributes packets to access routers suitable for transmitting packets to the mobile node 107, and transmits transmission packets to the distribution node situated at the logical location. Receiving packets from the upper layer of the transmission node, the distribution node 102 distributes the received packets to a part of or all of the radio transmitters 104-1 . . . , 104-$\Sigma_{Ni}$ included in the access routers 103-1 through 103-M. The packets distributed to a part of or all of the radio transmitters 104-1 . . . , 104-$\Sigma_{Ni}$ are then transmitted from these radio transmitters to the mobile node 107 through radio transmission paths.

After being received by the radio receivers 105-1 through 105-L of the mobile node 107, the packets transmitted from the radio transmitters in the above manner are combined by the combiner 106 to generate the original packet stream, which is outputted to the next step.

As described above, in the network 150, packets transmitted through the upper layer of the transmission node are distributed to one or more of the radio transmitters 104-1 . . . , 104-$\Sigma_{Ni}$ by the distribution node 102 (different packets being distributed to each radio transmitter). These packets transmitted through the radio transmission paths are received and combined in the mobile node 107. Thus, a higher throughput can be obtained. Also, the access routers equipped with radio transmitters should be arranged in such a manner as to overlap one another. With this arrangement, a greater number of access routers can perform communication with the mobile node. Accordingly, the throughput in the overlapping area is increased, and the packet transfer rate with respect to the number of existing access routers can be increased.

Next, a case where the above packet transmission system is applied to an IP-based cellular system (hereinafter referred to simply as the "cellular system"), and a handover operation is performed in the cellular system will be described. In the following, this case will be regarded as the first embodiment of the present invention.

First Embodiment

Figure 2:
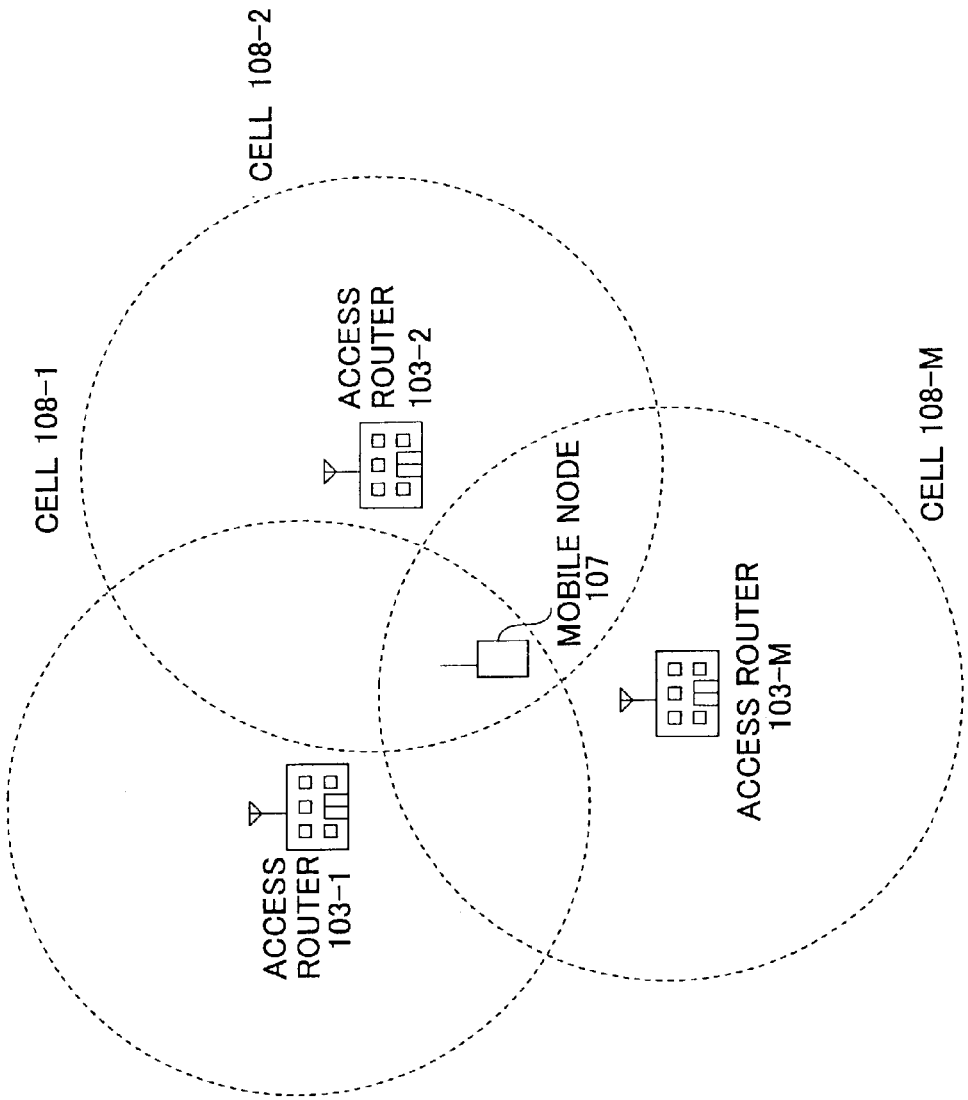
FIG. 2 illustrates an example of the arrangement of cells in a cellular system.

FIG. 2 illustrates an example structure of the cells in the cellular system. As can be seen from FIG. 2, the access routers 103-1 through 103-M are each arranged beforehand in each corresponding one of cells 108-1 through 108-M. Each of the cells 108-1 through 108-M is wide enough for packet transmission through each corresponding one of the access routers 103-1 through 103-M.

When existing within two or more cells, the mobile node 107 can receive packets transmitted from at least one of the access routers 103-1 through 103-M. The end of each cell overlaps the end of a neighboring cell, so that the service is not interrupted when the mobile node 107 moves from one cell to another. Accordingly, when located at the end of a cell, the mobile node 107 can usually communicate with two or more access routers.

Figure 3:
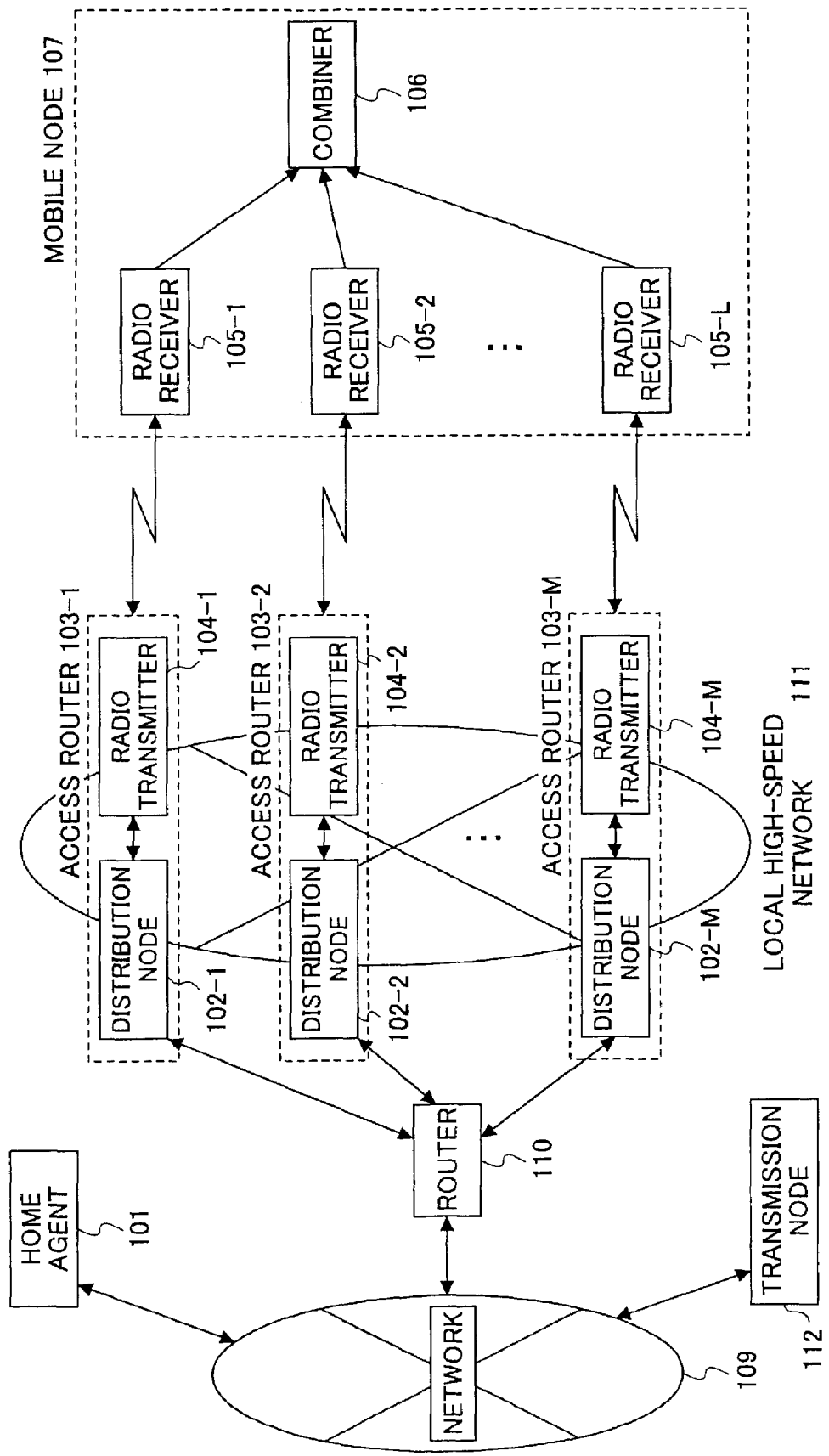
FIG. 3 illustrates an example structure of the cellular system shown in FIG. 2.

FIG. 3 illustrates an example system structure of the above cellular system.

As shown in FIG. 3, this cellular system includes a network 109, a home agent 101, a transmission node 112, a router 110, the access routers 103-1 through 103-M, and the mobile node 107. The network 109 is connected to the home agent 101, the transmission node 112 that transmits packets to the mobile node 107, and the router (an edge router) 110 that relays packets transmitted from the transmission node 112 to one or more designated access routers. Each of the access routers 103-1 through 103-M in the network 109 is provided with the corresponding one of radio transmitters 104-1 through 104-M. The access method of these radio transmitters 104-1 through 104-M may be formed by a single method or combined methods, as long as packets transmitted from the radio transmitters 104-1 through 104-M can be received by the mobile node 107. Each of the access routers 103-1 through 103-M is provided with the corresponding one of distribution nodes 102-1 through 102-M that has a function of distributing packets. The access routers 103-1 through 103-M are arranged close to one another, and are connected to one another via a local high-speed network 111. Also, the mobile node 107 is provided with radio receivers 105-1 through 105-L that receive packets transmitted from access routers via radio sections and a combiner 106 that combines packets outputted from the radio receivers 105-1 through 105-L.

In this embodiment, a local handover process (from the distribution nodes to the combiner) is regarded as the protocols of the link layer. The other general handover processes (such as the process of the transmission node 112 transmitting packets to the connection-point access router, referring to the home agent 101) are contained in the network layer protocols such as mobile IPs.

In the following, an operation of transmitting a downlink packet from the transmission node 112 in the network 109 to the mobile node 107 in the above structure will be described.

The mobile node 107 first determines which one(s) of the radio transmitters 104-1 through 104-M in the network 109 can communicate with the radio receivers 105-1 through 105-L of the mobile node 107. This determination may be performed by the radio receivers 105-1 through 105-L of the mobile node 107, which measure the reception strengths of notification signals transmitted with a known transmission power level from the radio transmitters 104-1 through 104-M of the network 109, then select only the radio transmitters that have the reception strength levels above a predetermined threshold level, and restrict the types and the number of radio transmitters with which the mobile node 107 can perform simultaneous packet reception. For instance, in a case where the mobile node 107 only has the ability to receive signals from three radio transmitters at once, the reception strengths of notification signals are measured, and, even if the number of radio transmitters that have the reception strength levels above the predetermined threshold level is 4 or greater, the radio transmitters having the three highest reception strength levels are selected. Here, the predetermined threshold level may be represented by either a predetermined electric power value or an electric power value that varies with situations (for instance, a value obtained by multiplying the reception strength value of the radio transmitter having the highest radio strength by a predetermined coefficient that is larger than 0 but smaller than 1).

The mobile node 107 next selects one of the radio transmitters 104-1 through 104-M that has the transmission path in an excellent condition and constantly performs excellent transmission (the mobile node 107 selects the radio transmitter 104-1, for example). Although only one radio transmitter is selected in this example for ease of explanation, it is possible to select two or more radio transmitters in practice. The mobile node 107 requests the home agent 101 to register the logical location information as to the distribution node (the distribution node 102-1 in this example) included in the access router that is the selected radio transmitter, which constantly performs excellent transmission. The mobile node 107 further makes the distribution node 102-1 register the group of radio transmitters 104-1 through 104-M from which the mobile node 107 can receive packets.

When having transmission packets directed to the mobile node 107, the transmission node 112 inquires of the home agent 101 through which transmission path the packets should be transmitted to the mobile node 107 in accordance with the IPs. As described above, the home agent 101 has the logical location information of the distribution node 102-1 registered as the address of the mobile node 107. Accordingly, in response to the above inquiry from the transmission node 112, the information indicating the logical location of the "distribution node 102-1" is supplied. The transmission node 112 then transfers the transmission packets to the router 110, so that the packets reach the distribution node 102-1 selected in accordance with the home agent 101.

The packets, which have been subject to the routing by the router 110 and have reached the distribution node 102-1, are divided and distributed equally to the group of radio transmitters 104-1 through 104-M from which the mobile node 107 can receive packets. This distribution is performed by the local high-speed network 111, causing a slight delay in packet transfer. Although the packet distributing method in this embodiment is an equal distributing method, the distribution ratio of the packets may be varied. In such a case, the distribution ratio of the packets is varied based on one or more items of information including: ①information as to each band area through which communication with the mobile node 107 can be performed; ②information as to communication charges; and ③information as to a delay in packet transfer from the distribution node to each corresponding radio transmitter.

For instance, if the band area through which communication with one radio transmitter can be performed is wide (①), or if the charges for communication services provided through the radio transmitter are low (②), or if the delay in packet transfer from a distribution node 102-1 to the radio transmitter is small (③), the distribution node 102-1 increases the amount of packet distribution for the radio transmitter. By doing so, the distribution node 102-1 can perform more appropriate packet distribution based on the information items (①-③) about each of the radio transmitters 104-1 through 104-M, compared with a case of equally dividing and distributing packets. The information as to each communicable band area can be obtained by measuring the radio transmitter or the mobile node measuring the condition of the transmission path or the congestion state of the radio link. Also, the information as to the communication charges can be obtained by inquiring of the server that manages the charge information in the network. A delay in packet transfer can be measured by dividing a network delay in packet transfer to and from each of the radio transmitters 104-1 through 104-M by 2.

The mobile node 107 monitors changes in the conditions (such as reception conditions) of the group of radio transmitters from which the mobile node 107 can receive packets in desired timing. If there is a change detected, the mobile node 107 notifies the distribution node 102-1 in the access router 103-1 of the result. If the mobile node 107 moves far away from the access router 103-1, some other distribution node can take over the distribution function of the distribution node 102-1 serving the mobile node 107. More specifically, the mobile node 107 notifies the home agent 101 of the logical location information about the new distribution node, and notifies the new distribution node of the group of radio transmitters from which the mobile node 107 can receive packets. This corresponds to a handover in the upper layers. However, there is no need to immediately move the distribution function just because radio transmitters that can perform the best transmission are changed. Still, a better effect in minimizing the delay in data transfer from the distribution node to each access router can be expected by immediately moving the distribution function to a new distribution node that is a handover destination. Also, the distribution function can be moved, after the mobile node 107 moves a certain distance away from the access router to which the currently serving distribution node belongs (for instance, after the radio transmitter in the access router to which the currently serving distribution node belongs is removed from the list of destinations of packet distribution performed by distribution nodes). In this manner, the frequency of moving the distribution function (i.e., the frequency of handover in the upper layers) can be reduced, and the control operation involved in moving the distribution function can be simplified. Accordingly, the frequency of relaying the update information of the upper-layer connection point of the mobile node 107 to the home agent 101 is reduced. Even if the home agent 101 is located in a remote place, this packet transmission method can prevent degradation in performance due to a transmission delay between the home agent 101 and the upper-layer connection point and an increase in traffic with a handover control signal.

As a local handover is hidden from the upper layer, it is not necessary to take the transitional conditions (such as soft handover and buffering processes) of the handover into consideration in designing the upper layer. Accordingly, the handover protocols in the upper layer can be simplified. Further, as the local high-speed network 111 is used for transferring local packets, the transfer delay can be reduced, and packet transmission with a smaller delay can be performed, compared with the packet transfer by the upper layer.

Figure 4:
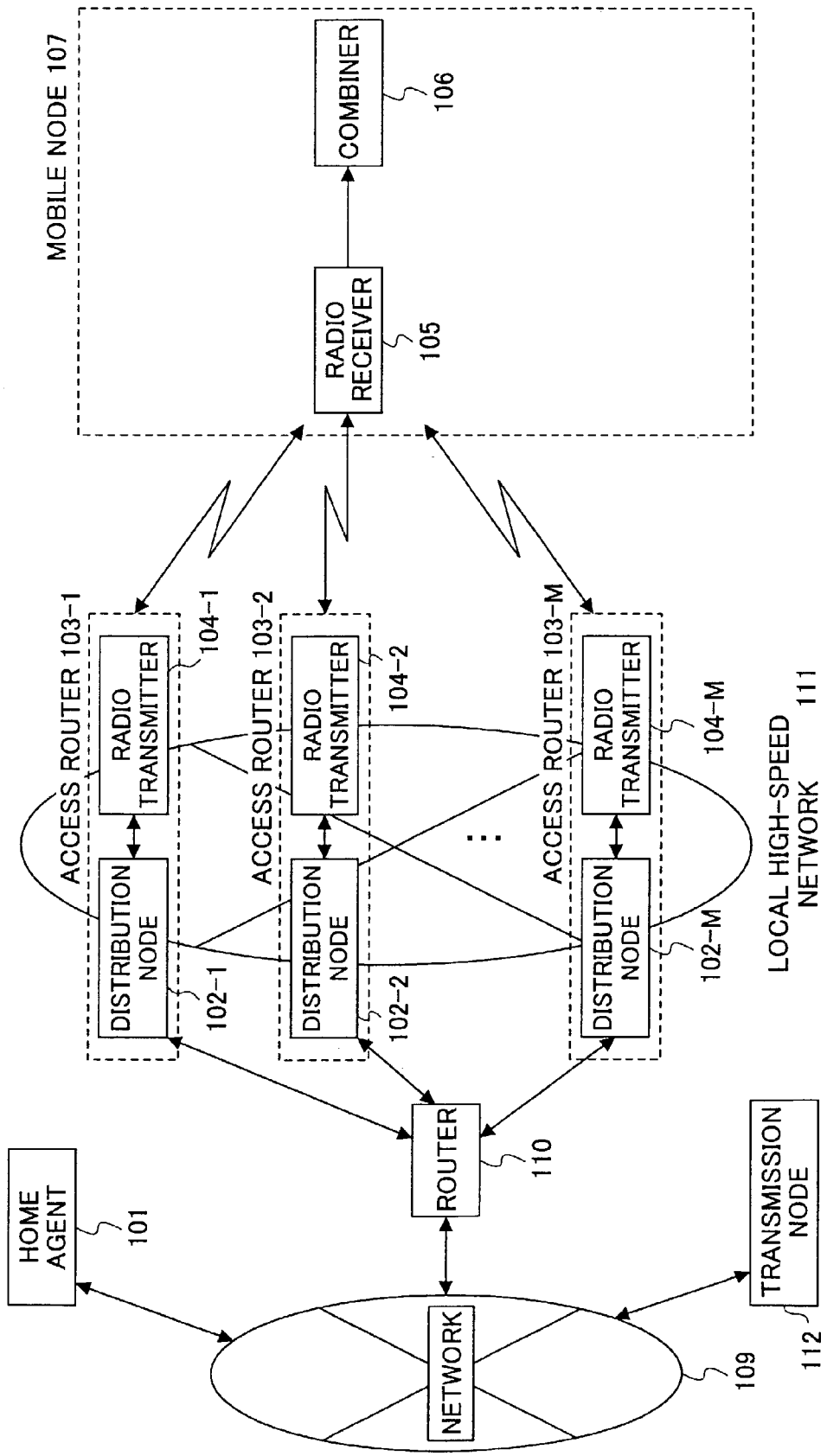
FIG. 4 illustrates another example structure of the cellular system shown in FIG. 2.

If a radio access method or a radio reception structure in which signals from the radio transmitters 104-1 through 104-M can be received by one radio receiver is applied to the above embodiment, only one radio receiver is sufficient for the mobile node 107, as shown in FIG. 4. For instance, to realize this structure, signals should be transmitted from the radio transmitters 104-1 through 104-M in different timings (separately from one another), and the radio receiver on the receiving end should receive signals from each radio transmitter in timing different from signals from the other radio transmitters. By employing only one radio receiver in this manner, the throughput can be increased without an increase of the number of radio receivers in the mobile node 107.

In the following, an operation involving an overlaid system with different types of networks will be described as a second embodiment of the present invention.

Second Embodiment

Figure 5:
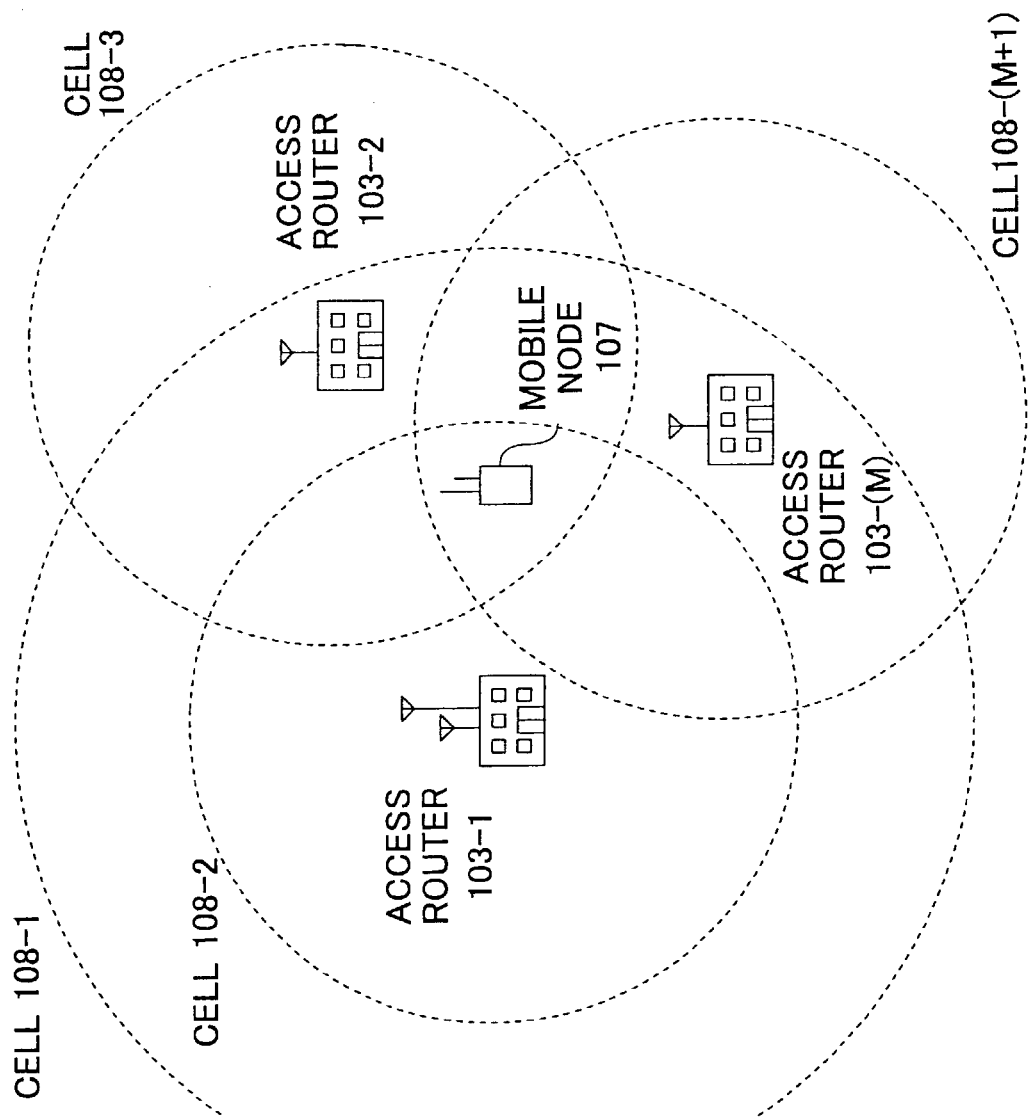
FIG. 5 illustrates an example of the arrangement of cells in an overlaid communication system in which a single cell system and a cellular system are overlaid on each other.

FIG. 5 illustrates an example structure of an overlaid system in which a single cell system (used in an in-house network such as a wireless LAN) and a cellular system are overlaid on each other. In FIG. 5, access routers 103-1 through 103-M are arranged in cells 108-1 through 108-(M+1). Among these access routers 103-1 through 103-M, the access router 103-1 is equipped with radio transmitters of two different types of radio access methods (such as the CDMA method and the OFDM method), and therefore can transmit packets to the different cells 108-1 and 108-2. The range at which the access routers 103-1 through 103-M can transmit packets is represented by the cells 108-1 through 108-(M+1). When existing in more than one cell, the mobile node 107 can receive packets from one of the corresponding access routers. The cells 108-2 through 108-(M+1) form a cellular system of a single radio access method. As shown in FIG. 5, the communicable ranges at the cell edges of each two neighboring cells overlap each other, so that the service is not interrupted when the mobile node 107 moves from one cell to another. Meanwhile, the cell 108-1 forms a single cell system. A plurality of communication systems are overlaid in this manner, so that communication can be performed with a plurality of access routers not only at the cell edges but in the entire area of the cells.

Figure 6:
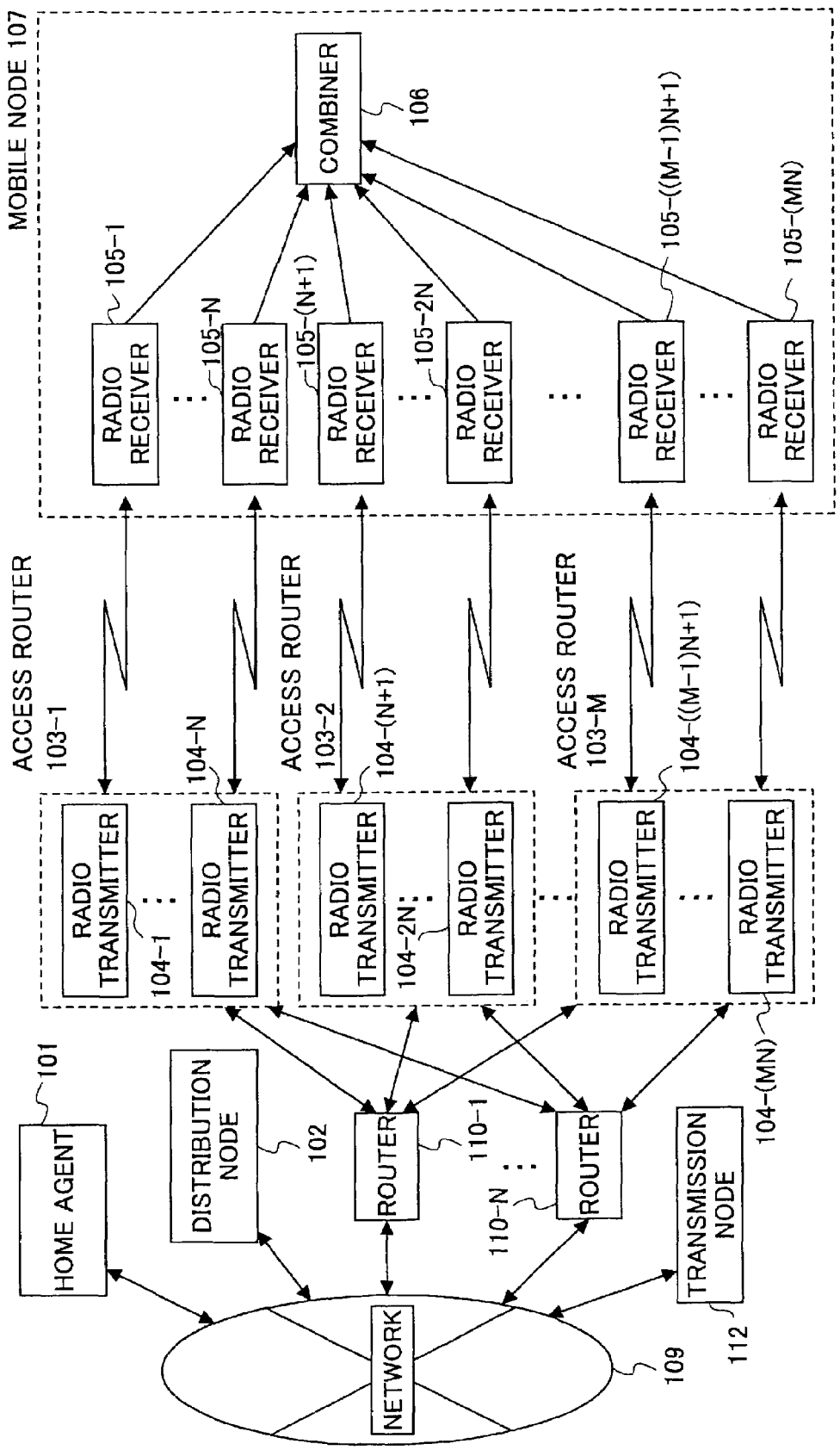
FIG. 6 illustrates an example structure of the overlaid communication system shown in FIG. 5.

FIG. 6 shows an example structure of the system in which a single cell system and a cellular system are combined as shown in FIG. 5.

As can be seen from FIG. 6, this system includes a home agent 101, a distribution node 102, access routers 103-1 through 103-M, a mobile node 107, a network 109, routers 110-1 through 110-N, and a transmission node 112. The network 109 is connected to the home agent 101, the transmission node 112 that performs packet transmission, and the routers (edge routers) 110-1 through 110-N that relay packets from the transmission node 112 to the access routers 103-1 through 103-M. Each of the routers 110-1 through 110-N is connected to the access routers 103-1 through 103-M. Although each of the access routers 103-1 through 103-M is provided with N types of radio transmitters in the drawing, it is not necessary to employ all the N types of radio transmitters in practice. The mobile node 107 is provided with one or more radio receivers to receive signals transmitted from the radio transmitters of the access routers 103-1 through 103-M, and a combiner 106 that combines the packets received at the radio receivers.

Although in FIG. 6 the total number (MN) of radio transmitters provided in the access routers is the same as the number (MN) of radio receivers provided in the mobile node 107, these numbers may be different. The number of radio transmitters and the number of radio receivers required can be arbitrarily determined by the number of signals desired to be received simultaneously at the mobile node 107 in accordance with the radio access method.

In this embodiment, the distribution node 102 is independently connected to the network 109, instead of being connected directly to the insides of the access routers. Accordingly, the distribution node 102 is connected to the radio transmitters 104-1 through 104-(MN) in the access routers 103-1 through 103-M via the routers 110-1 through 110-N.

The transmission node 112 retrieves the logical location information of the distribution node (the distribution node 102 in this embodiment) to be used by the mobile node 107, i.e., the connection point information as to the upper layer in the network 109, from the home agent 101. The transmission node 112 then transmits packets to the upper-layer connection point (i.e., the distribution node 102). The distribution node 102 distributes the packets to the radio transmitters 104-1 through 104-(MN). At this point, the distribution node 102 transfers the packets via the routers 110-1 through 110-N, using the upper-layer protocols (the Internet protocols, for instance), unlike the distribution node(s) in the first embodiment. With the use of the upper-layer protocols in the packet transfer, a greater delay in packet transfer is expected, compared with a case where a special-purpose network is employed. However, the advantages of the use of the upper-layer protocols are that it is not necessary to employ a special-purpose network to connect the radio transmitters, and that radio transmitters to distribute and transmit packets can be selected with greater flexibility. Accordingly, this embodiment can be easily applied to packet transmission for application that does not have very specific requirements for packet transmission delays (such as text data transmission), so as to achieve a higher throughput.

Also, in the packet transmission process for application that has very specific requirements for packet transmission delays (such as video image transmission in a TV conference), this embodiment can be applied if the connection between the network and the routers and the connection between the routers and the radio transmitters are designed in such a manner that the transfer delay due to packet transfer can be made small enough by comparing the delay requirements using the upper layer. In this manner, a higher throughput can be achieved.

A part of or all of the radio transmitters 104-1 through 104-(MN) can be interconnected to one another, if necessary, by a local high-speed network in the same manner as in the first embodiment. With the interconnection of a part of or all of the radio transmitters 104-1 through 104-(MN) by a local high-speed network, an increase of the transmission delay in this embodiment can be restricted.

Although the home agent 101 holds the connection point information of the upper layer in the first and second embodiments, the present invention is not limited to this structure. For instance, it is possible to employ a structure in which the routers 110 and 110-1 through 110-N hold the connection point information. In such a case, the transmission node 112 retrieves the connection point information from the router 110 or the routers 110-1 through 110-N so as to transmit packets to access routers that are designated packet destinations.

Also, downlink packet transmission is performed only for one mobile node in the first and second embodiments. However, the present invention can be applied to multi-hop communication, if a plurality of mobile nodes located in the vicinity of one another are regarded as one virtual mobile node. In such a case, packets are distributed to any one of the mobile nodes, and the mobile node that has received the packets performs communication with the other mobile nodes so as to transfer the packets to the other mobile nodes. Accordingly, packet reception by all the mobile nodes via a network is not necessary. Thus, the network resource can be more efficiently utilized.

In the above embodiments, the distribution node 102 and the distribution nodes 102-1 through 102-M correspond to the packet distributor in the claims. The packet combining function of the combiner 106 of the mobile node 107 corresponds to the packet combiner and the packet retriever. The downlink quality determination notifying function of the mobile node 107 corresponds to the communication possibility notifying part. The connection point information holding function of the home agent 101 corresponds to the distributor location information holder and the distribution node registration/update part. The radio transmitting function of each of the access routers 103-1 through 103-M corresponds to the packet parallel transmitter. The receiving function of each of the radio receivers 105, 105-1 through 105-L, and 105-1 through 105-(MN) of the mobile node 107 corresponds to the packet receiver. Further, the controlling function of each of the distribution nodes 102 and 102-1 through 102-M corresponds to the communicable radio transmitter detector. The packet distribution controlling function of each of the distribution nodes 102 and 102-1 through 102-M corresponds to the packet distribution ratio setting part and the packet transfer part. The communicating function of each of the distribution nodes 102 and 102-1 through 102M corresponds to the special-purpose packet transfer (link) part and the packet upper-layer transfer part. Further, the system information notifying function of each of the access routers 103-1 through 103-M corresponds to the reported information notifying part. The information holding and controlling function of each of the routers 110 and 110-1 through 110-N corresponds to the distribution location information holder.

It should be noted that the present invention is not limited to the embodiments specifically disclosed above, but other variations and modifications may be made without departing from the scope of the present invention.

What is claimed is:

1. A packet transmission system comprising:
a mobile node;
a network that has a radio link with the mobile node, and transmits downlink packets to the mobile node;
and a home agent that manages connection point information about the mobile node in the network,
the network including a packet distributor that inputs a packet stream and divides packets from the packet stream to be transmitted to the mobile node, and a packet parallel transmitter that distributes the packets divided by the packet distributor to a plurality of radio transmission devices provided in advance and transmits the packets through the radio transmission devices at once,
the mobile node including a packet receiver having a plurality of radio reception devices respectively receiving the packets transmitted by the radio transmission devices, and a packet combiner that combines the received packets to generate the packet stream, the home agent including a distributor location information holder that holds information of a logical location of the packet distributor as information of a connection point of the mobile node in the network, and when the network has packets to be transmitted to the mobile node, the network retrieving the connection point information from the distributor location information holder of the home agent, and inputting the packets to the packet distributor situated at the logical location specified by the retrieved connection point information.

2. The packet transmission system as claimed in claim 1, wherein the packet distributor includes a communicable radio transmitter detector that determines whether each of the radio transmission devices is communicable with the mobile node.

3. The packet transmission system as claimed in claim 1, wherein the packet distributor includes a packet distribution ratio setting part that sets an equal distribution ratio or a predetermined distribution ratio with which the packets to be transmitted are distributed.

4. The packet transmission system as claimed in claim 1, wherein the packet distributor changes the distribution ratio with which the packets to be transmitted are distributed, based on the reported information sent by the reported information notifying part.

5. The packet transmission system as claimed in claim 1, wherein:

the packet distributor includes a packet transfer part that transfers the packets distributed to the radio transmitters to the packet combiner in accordance with lower-layer protocols; and the packet combiner includes a packet retriever that retrieves packets transferred by the packet transfer part in accordance with the lower-layer protocols.

6. The packet transmission system as claimed in claim 1, further comprising a router that relays packets from the network to the radio transmission devices, wherein the distributor location information holder of the home agent is provided in the router.

7. A method of transmitting downlink packets from a network to a mobile node having a plurality of radio reception devices, with the network being connected to a home agent that manages information as to a connection point of the mobile node located in the network, and the network including a distribution node that inputs a packet stream and distributes packets from the packet stream, the method comprising:

retrieving information as to a logical location of the distribution node as the connection point information held in the home agent, when transmitting the packets to the mobile node;

inputting the packets to the distribution node situated at the logical location designated by the retrieved connection point information;

transmitting each of the distributed packets that are divided from the packet stream from the distribution node to the mobile node through each of the a plurality of radio transmission devices, respectively that are set in advance;

and receiving the packets transmitted through the radio transmission devices respectively with the plurality of radio reception devices and combining the received packets so as to generate the packet stream by the mobile node.

8. A packet transmission device that is connected to a network including a transmission node and a plurality of radio transmission devices, and transmits packets directed to a mobile node via the network, the network, when packets are to be transmitted to the mobile node, retrieving connection point information from a distributor location information holder of a home agent, and inputting the packets to the packet distributor situated at a logical location specified by the retrieved connection point information, the packet transmission device comprising:

a packet distributor that distributes packets from the transmission node to the radio transmission devices; and the packet distributor that further inputs a packet stream and divides packets from the packet stream to be transmitted to the mobile node, and a packet parallel transmitter that distributes the packets divided by the packet distributor to a plurality of radio transmission devices provided in advance and transmits the packets through the radio transmission devices at once, a communicable radio transmitter detector that determines whether each of the radio transmission devices to which packets are distributed can communicate with the mobile node.

9. The packet transmission device as claimed in claim 8, wherein the packet distributor includes a packet distribution ratio setting part that sets an equal distribution ratio or a predetermined distribution ratio with which the packets to be transmitted are distributed.

10. The packet transmission device as claimed in claim 8, wherein the packet distributor changes the packet distribution ratio with which the packets to be transmitted are distributed, based on reported information supplied from each of the radio transmission devices.

11. The packet transmission device as claimed in claim 8, wherein the packet distributor includes a packet transfer part that transfers the packets distributed to the radio transmission devices to a packet combiner in accordance with lower-layer protocols.

12. The packet transmission device as claimed in claim 11, wherein the packet distributor includes a special-purpose packet transfer (link) part that transfers the packets distributed to the radio transmission devices through a special-purpose link.

13. The packet transmission device as claimed in claim 12, wherein the packet distributor includes a packet upper-layer transfer part that transfers the packets distributed to the radio transmission devices in accordance with the upper-layer protocols.

14. A mobile terminal that receives downlink transmission packets from a network that includes a distribution node for inputting a packet stream and distributing packets divided from the packet stream to be transmitted to the mobile terminal, the network, when packets are to be transmitted to the mobile terminal, retrieving connection point information from a distributor location information holder of a home agent, and inputting the packets to the packet distributor situated at a logical location specified by the retrieved connection point information, the mobile terminal comprising a plurality of predetermined radio reception devices, and further comprising a packet combiner that receives packets from the packet stream distributed by the distribution node and transmitted from a predetermined plurality of radio transmission devices provided in advance to each of the predetermined plurality of radio reception devices respectively at once, and combines the received packets to generate the packet stream, the predetermined plurality of radio reception devices being provided in the packet combiner.

15. The mobile terminal as claimed in claim 14, further comprising a communication possibility notifying part that determines whether the mobile terminal can communicate with a plurality of radio transmission devices, and notifies the distribution node of the determination result.

* * * * *